US007986644B2

(12) United States Patent
Frankel

(10) Patent No.: US 7,986,644 B2
(45) Date of Patent: Jul. 26, 2011

(54) MULTI-FIDELITY CONFERENCING BRIDGE

(75) Inventor: David P. Frankel, Los Gatos, CA (US)

(73) Assignee: David P. Frankel, Los Gatos, CA (US)

( * ) Notice: Subject to any disclaimer, the term of this patent is extended or adjusted under 35 U.S.C. 154(b) by 1168 days.

(21) Appl. No.: 11/686,186

(22) Filed: Mar. 14, 2007

(65) Prior Publication Data

US 2008/0101577 A1    May 1, 2008

Related U.S. Application Data

(60) Provisional application No. 60/855,341, filed on Oct. 30, 2006.

(51) Int. Cl.
*H04L 12/16*  (2006.01)
*H04Q 11/00*  (2006.01)

(52) U.S. Cl. .......................... 370/260; 370/266
(58) Field of Classification Search .................. None
See application file for complete search history.

(56) References Cited

U.S. PATENT DOCUMENTS

| 5,859,904 | A | 1/1999 | Huang |
| 6,282,278 | B1 * | 8/2001 | Doganata et al. ......... 379/202.01 |
| 2007/0140456 | A1 * | 6/2007 | Rodman et al. .......... 379/202.01 |
| 2007/0299661 | A1 * | 12/2007 | Raad et al. ............... 704/221 |
| 2008/0222536 | A1 * | 9/2008 | Berstis et al. ............. 715/753 |

OTHER PUBLICATIONS

Buchhorn et al.; "VidMid Videoconferencing Workplan Scenarios for Videoconferencing"; website: www.middlewareinternet2.edu/video/draftdocs/draft-internet2-vidmid-vc-prioritized-work; Jan. 25, 2002; pp. 1-7.
"System Properties and Preferences"; website: www.webofficedemo.com/resources/webhelp/WebOffice_Manager/System; pp. 1-15.
Baudin, et al.; "Supporting Distributed Experts in E-meetings for Synchronous Collaboration"; 2002 IEEE International Conference on Systems; pp. 1-7.

* cited by examiner

*Primary Examiner* — Chirag Shah
*Assistant Examiner* — Srinivasa Reddivalam
(74) *Attorney, Agent, or Firm* — Ballard Spahr LLP

(57) ABSTRACT

Embodiments according to the present invention allow multiple parties equipped with telecommunications devices (endpoint devices) of similar or differing audio capabilities to join in a conference call and enjoy the fidelity associated with their equipment. Rather than operating with the frequency and fidelity limits of traditional telecommunications circuits (for example, about 300-3500 Hz), at least a portion of a conference bridge according to the present invention operates at higher frequencies. Conference participants using high-fidelity endpoint devices hear each other with greater clarity and reproduction accuracy. Conference participants using conventional interfaces send and receive lower-fidelity audio, but it affects only their own participation and not that of the entire conference. Participants can connect via for example, wireline, wireless Public Switched Telephone Network (PSTN), or via networks such as the Internet. Multiple voice encoding schemes are accommodated.

43 Claims, 6 Drawing Sheets

MULTI-FIDELITY CONFERENCING BRIDGE

CROSS REFERENCE TO RELATED APPLICATIONS

This application claims benefit of and priority to U.S. Provisional Application Ser. No. 60/855,341, filed Oct. 30, 2006, which application is hereby incorporated by this reference in its entirety.

BACKGROUND

1. Field of the Invention

This invention relates generally to conferencing and more particularly to systems and methods of audio teleconferencing using a conferencing bridge. Even more particularly, embodiments according to the present invention relate to the conferencing of high-fidelity and conventional callers, over traditional and network-based (e.g., Internet) connections.

2. Background

Generally, forms of conference calling have been offered as a telecommunications service for some number of years and such service is relied upon by many businesses. As prices have dropped for conferencing equipment and conference hosting, conferencing has become increasingly popular and is now used by businesses and some consumers on a regular basis for local, national, and global virtual meetings. Participants typically dial into a conference "bridge"—a specialized system connected to the telephone network. The participants enter DTMF digits to identify the conference they wish to join. Once established, the system computes and sends to each participant the merged audio of the other participants. Specialized processing can eliminate echoes and noise and automatically equalize volume. The audio quality of the conference is limited to the capability of conventional telephone instruments and networks, which generally support about 300 to about 3500 Hertz frequency response using coder/decoder (codec) technology standardized by the ITU as G.711. This quality level, generally referred to as "narrowband," is generally adequate for conversational speech, but it can make it harder to recognize voices, discern certain phonetic sounds, separate speech from background noise, distinguish multiple simultaneous speakers, and hear soft or whispered speech.

In some instances, participants in a telephone conference can be physically co-located in a conference room. Telephone instruments called speakerphones or conference phones allow these participants to speak and listen normally without having to hold a handset. These conference phones can be used in a point-to-point configuration, where a group in one conference room calls to a conference phone in another, remote conference room, and the two groups can interact via a telephone connection. Alternatively, the conference phone can be used to dial into a conference bridge, described above. Thus, in some instances the participants on the bridge may include groups using conference phones as well as individuals with handsets.

Manufacturers of conference phones have introduced enhanced endpoint devices having encoding technology configured to capture sound at higher fidelity, offering a frequency response from about 80 to about 7000 Hertz (generally referred to as "wideband"), and producing a noticeably better audio experience. This allows participants to more readily recognize voices and to better understand what is said by a remote speaker. Typically, this enhanced audio capability is only operational when the endpoint device is operating in the point-to-point mode connected to another like device. In these instances, the endpoint device avoids limitations imposed by the telephone network (PSTN) by establishing a digital connection between two enhanced endpoint devices using modem technology, and then digitally sampling, encoding, and compressing the high-fidelity audio signal and exchanging it via the digital connection. If an enhanced endpoint device attempts to connect to a conventional conference bridge (i.e., a narrowband bridge), the narrow-band bridge is incapable of establishing the digital connection and the enhanced endpoint device is forced to revert to lower-fidelity, analog audio. One example of a manufacturer of enhanced endpoint devices is Polycom (Polycom, Inc., Pleasanton, Calif.), providers of a system designated VTX-1000™, which uses special encoding technology to capture sound at higher fidelity.

In addition to connections over the conventional telephone network, an increasing number of "telephone calls" are made over the Internet utilizing technology commonly referred to as Voice-over-Internet-Protocol, or VoIP. These calls are made with special Internet telephones, with adapters that interface traditional phones to the Internet, or with Internet-connected personal computers augmented with headsets and special software. Most commonly, Internet calls mimic the audio quality of traditional telephony, and in many cases can communicate with conventional bridges or with bridges specially interfaced to the Internet. Some Internet telephone systems have technology for higher-fidelity audio; this capability generally applies only in point-to-point communications with like (or compatible) devices. For a variety of technical reasons, it is easier and cheaper to implement wideband audio in the Internet domain, so this option is becoming increasingly common as Internet telephony grows in popularity. Skype™ (Skype™ is an eBay, Inc. company, San Jose, Calif.) and GoogleTalk™ (Google Inc., Mountain View, Calif.) are examples of commercially-available high-fidelity VoIP-based networks.

Because current conferencing technology sets the frequency response to the lowest common denominator of the endpoint devices accessing a bridge, in many instances enhanced or wideband endpoint devices are not able to utilize their greater fidelity when participating in conferences that also include narrow-band endpoint devices. Embodiments according to this invention provide a way to overcome these challenges, some of which are described above.

SUMMARY OF THE INVENTION

Embodiments according to the present invention provide systems and methods for a multi-fidelity teleconferencing platform that facilitates a conference call among two or more conference participants. Each participant can connect to the system via the PSTN, using a landline or mobile telephone, or via IP networks such as the Internet using Voice-over-Internet-Protocol technology. A participant can connect at a traditional audio quality level (narrowband) using standard PSTN coding, or at a higher fidelity level (wideband) using any of a variety of wideband coding mechanisms.

Once the participants are connected, the conference is conducted in high-fidelity, so that participants connected in that mode using wideband endpoint devices can enjoy the benefits of higher quality audio. The voices of those participants connected to the conference via narrow-band endpoint devices will not be at the higher response frequency (i.e., will not sound as good), and the audio that those low-fidelity participants hear will not be as good as what the other participants hear. However, the presence of one or more participants connected via narrowband endpoint devices will not cause the entire conference to revert to low-fidelity (i.e., lower response frequency).

In one aspect according to the present invention a multi-fidelity conferencing system is provided. Components of the system include an audio conferencing bridge comprised of wideband components operating at a first sampling frequency and narrowband components operating at a second sampling frequency. A plurality of endpoint devices connect to the audio conferencing bridge through one or more networks. Each endpoint device is either a wideband endpoint device or a narrowband endpoint device and wideband endpoint devices accessing the conferencing bridge are provided a first fidelity audio conferencing signal sampled at the first sampling frequency and narrowband endpoint devices accessing the audio conferencing bridge are provided a second fidelity audio conferencing signal sampled at the second sampling frequency. The wideband components can be comprised of a wideband-capable mixer and the narrowband components can be comprised of a narrowband mixer such that the wideband endpoint devices are operatively connected to the wideband-capable mixer and the narrowband endpoint devices are operatively connected to the narrowband mixer, and the wideband-capable mixer is operatively connected to the narrowband mixer via a link for that purpose, which includes the necessary conversion between the two sampling frequencies.

Another aspect according to the present invention is a method of multi-fidelity conferencing. This method comprises receiving at an audio conferencing bridge at least two requests from a plurality of conference participants via two or more endpoint devices over one or more networks for conferencing services. It is determined whether each endpoint device is a wideband endpoint device or a narrowband input device. If it is a wideband endpoint device, then it is operatively connected to wideband components of the audio conferencing bridge and if the endpoint device is a narrowband endpoint device it is operatively connected to narrowband components of the audio conferencing bridge. The wideband components comprise a wideband-capable mixer and the narrowband components comprise a narrowband mixer, and the wideband-capable mixer is operatively connected to the narrowband mixer via a link for that purpose, which includes the necessary conversion between the two sampling frequencies. Conferencing services are provided among the plurality of conference participants via the audio conferencing bridge such that conference participants employing wideband endpoint devices to access the audio conferencing bridge are provided a first fidelity audio conferencing signal sampled at the first sampling frequency and conference participants employing narrowband endpoint devices to access the audio conferencing bridge are provided a second fidelity audio conferencing signal sampled at the second sampling frequency.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiment(s) of the invention and together with the description, serve to explain the principles of the invention.

DESCRIPTION OF THE PREFERRED EMBODIMENTS

Figure 1A:
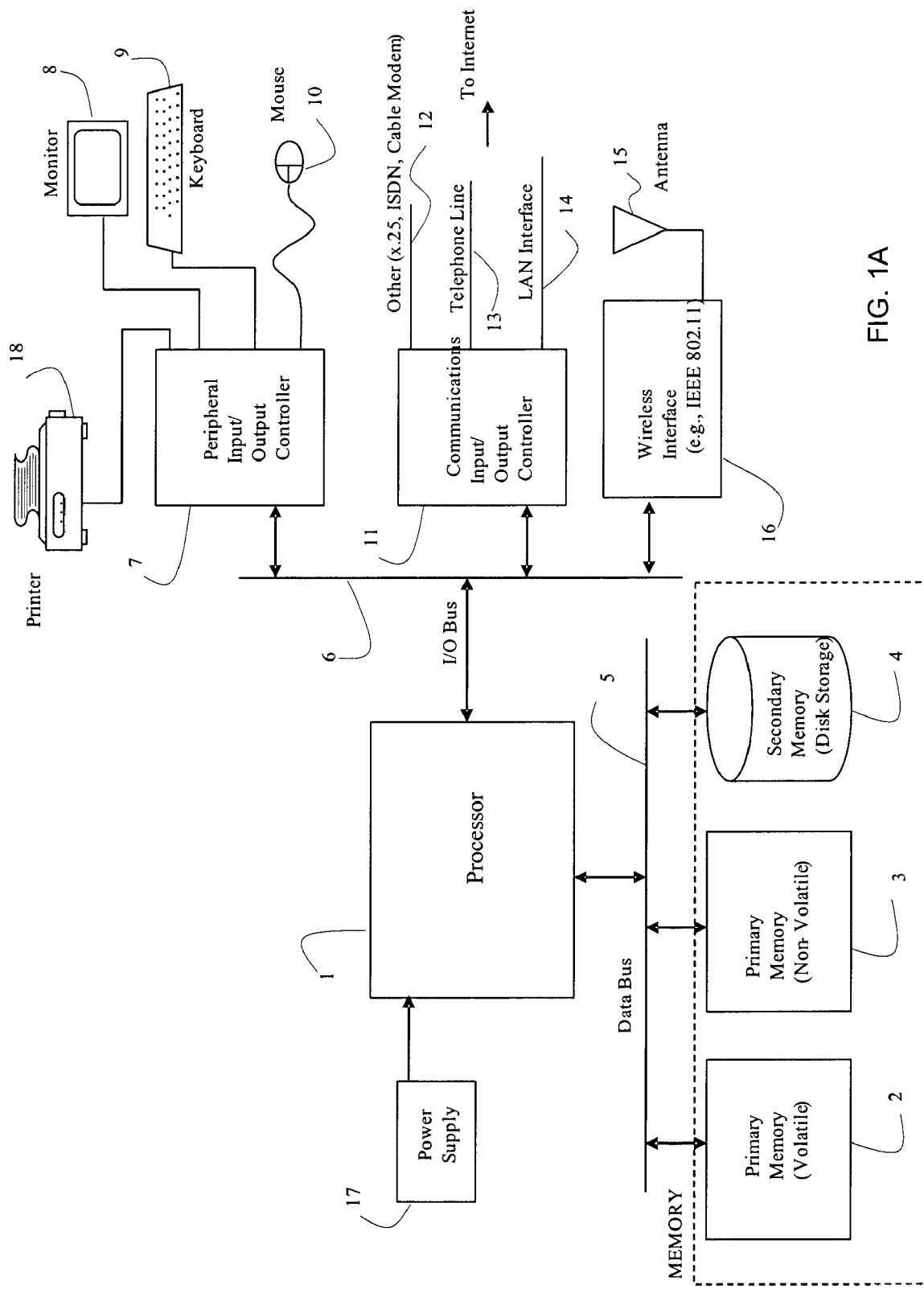
FIG. 1A is an exemplary computing device that can be used to practice aspects of the preferred embodiment.

The present invention may be understood more readily by reference to the following detailed description of preferred embodiments of the invention and the Examples included therein and to the Figures and their previous and following description.

As used in the specification and the appended claims, the singular forms "a," "an" and "the" include plural referents unless the context clearly dictates otherwise. Thus, for example, reference to "a" or "an" endpoint device may include two or more endpoint devices.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In this specification and in the claims which follow, reference will be made to a number of terms which shall be defined to have the following meanings: "Optional" or "optionally" means that the subsequently described event or circumstance may or may not occur, and that the description includes instances where said event or circumstance occurs and instances where it does not.

Reference will now be made in detail to the present embodiments according to the invention, examples of which are illustrated in the accompanying drawings. Wherever possible, the same reference numbers are used throughout the drawings to refer to the same or like parts.

As will be appreciated by one skilled in the art, the preferred embodiment or aspects of the preferred embodiment may be implemented as a method, a data processing system, or a computer program product. Accordingly, the preferred embodiment may take the form of an entirely hardware embodiment, an entirely software embodiment, or an embodiment combining software and hardware aspects. Furthermore, implementations of the preferred embodiment or aspects of the preferred embodiment may take the form of a computer program product on a computer-readable storage medium having computer-readable program instructions (e.g., computer software) embodied in the storage medium. More particularly, implementations of the preferred embodiments may take the form of web-implemented computer software. Any suitable computer-readable storage medium may be utilized including hard disks, CD-ROMs, optical storage devices, magnetic storage devices, etc.

The preferred embodiments according to the present invention are described below with reference to block diagrams and flowchart illustrations of methods, apparatuses (i.e., systems) and computer program products according to embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus, such as the ones described below, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In the preferred embodiments referenced herein, a "computer," "computing device," "controller," or "server" may be referenced. Such computer may be, for example, a mainframe, desktop, notebook or laptop, a hand held device such as a data acquisition and storage device, or it may be a processing device embodied within another apparatus such as, for example, a processor incorporated into telephonic system such as a private branch exchange (PBX) system or network devices having processors. In some instances the computer may be a "dumb" terminal used to access data or processors over a network such as the Internet. Turning to FIG. 1A, one embodiment of a computing device is illustrated that can be used to practice aspects of the preferred embodiment. In FIG. 1A, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access a wide area network such as the Internet, intranets, LANs, or other data communication facilities.

Finally, the processor 1 may communicate with a wireless interface 16 that is operatively connected to an antenna 15 for communicating wirelessly with another device, using for example, one of the IEEE 802.11 protocols, 802.15.4 protocol, or a standard 3G wireless telecommunications protocols, such as CDMA2000 1xEV-DO, GPRS, W-CDMA, or other protocol.

Figure 1B:
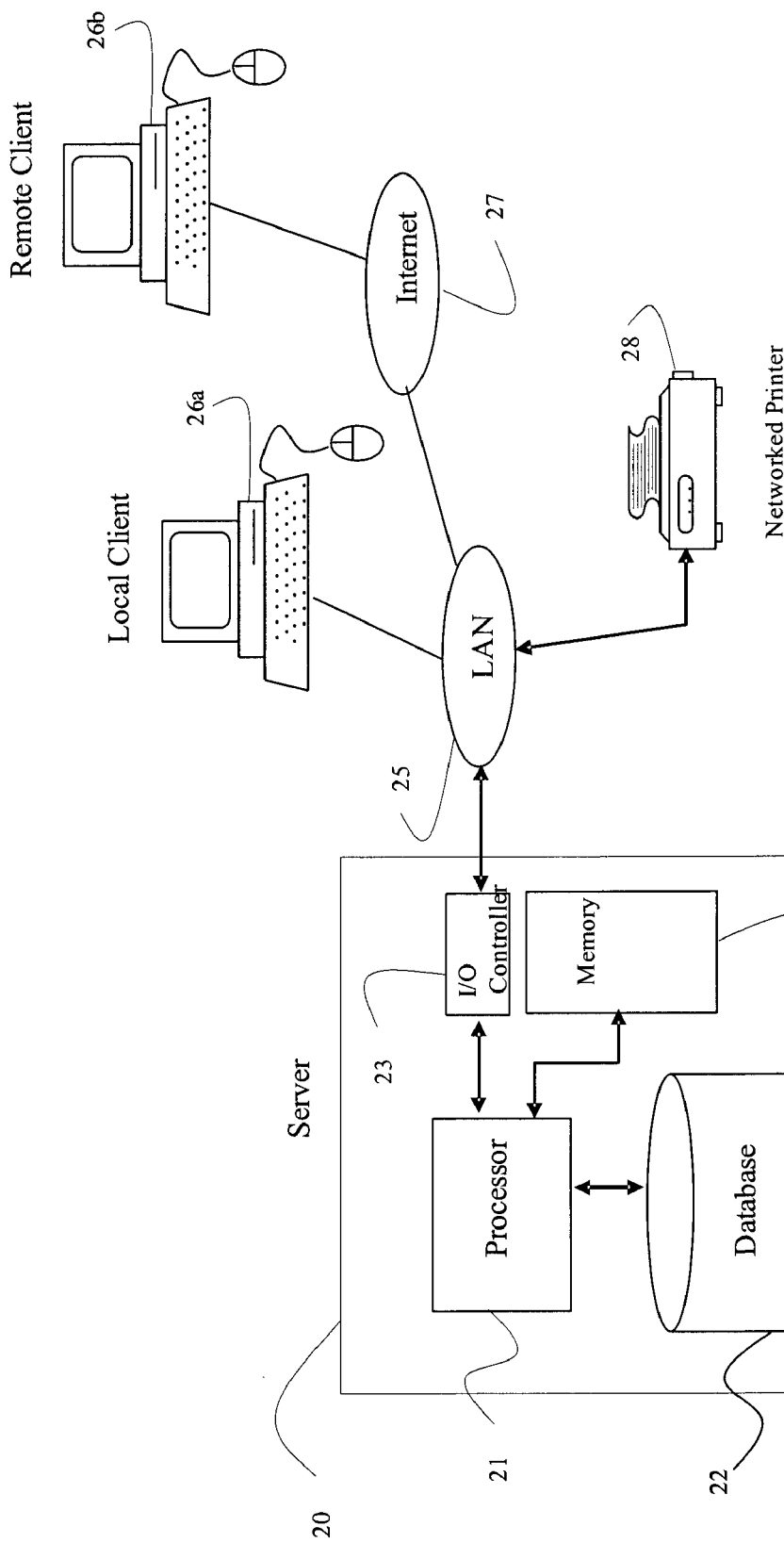
FIG. 1B is an alternative embodiment of a processing system of that shown in FIG. 1A that may be used in embodiments according to the present invention.

An alternative embodiment of a processing system that may be used is shown in FIG. 1B. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to a wide area network 27, such as the Internet. A remote client computer 26b may execute a web browser, so that the remote client 26b may interact with the server as required by transmitted data through the wide area network 27, over the LAN 25, and to the server 20.

Those skilled in the art of data networking will realize that many other alternatives and architectures are possible and can be used to practice the preferred embodiments. The embodiments illustrated in FIGS. 1A and 1B can be modified in different ways and be within the scope of the present invention as claimed.

Aspects according to the present invention provide systems and methods for a multi-fidelity teleconferencing platform that facilitates a conference call among two or more participants. Each participant can connect to the system via various means such as, for example, PSTN, using a landline or mobile telephone, networks such as the Internet using VoIP technology, etc. A participant can connect at a traditional audio quality level (narrowband) using, for example, standard PSTN coding, or at a higher fidelity level (wideband) using any of a variety of wideband coding mechanisms.

Conferences conducted in accordance with embodiments according to the present invention are conducted in high-fidelity, so that participants connected via wideband endpoint devices enjoy the benefits of higher quality audio. The voices of those connected via narrowband endpoint devices (i.e., low-fidelity participants) will not sound as good, and the audio that those low-fidelity participants hear will not be as good as what other high-fidelity participants hear. However, the presence of one or more low-fidelity participants will not cause the entire conference to revert to low-fidelity (i.e., the system does not operate at the lowest common denominator).

Conference calls generally are comprised of a plurality of participants and often comprise three or more participants. Historically, each participant had to be using the same audio encoding technology, and generally, this is the G.711 coding used in the PSTN, though other codecs are contemplated within the scope of this invention. Even if two (or more) of the participants in a call had the capability to invoke high-fidelity audio, their voices would be converted to G.711 in order to be compatible with other participants and with the conference bridge technology itself. The advantages of high-fidelity audio were therefore lost in order to accommodate "the lowest common denominator."

Embodiments according to the present invention preserve the high-fidelity audio for any participants suitably equipped, while still allowing low-fidelity participants to participate in a conference. Callers can connect via a network such as the Internet, or via the PSTN, and can use any of a variety of low- or high-fidelity codecs. Embodiments according to the present invention provide the necessary interfaces and transcoding to allow all of the participants to seamlessly interact.

Figure 2:
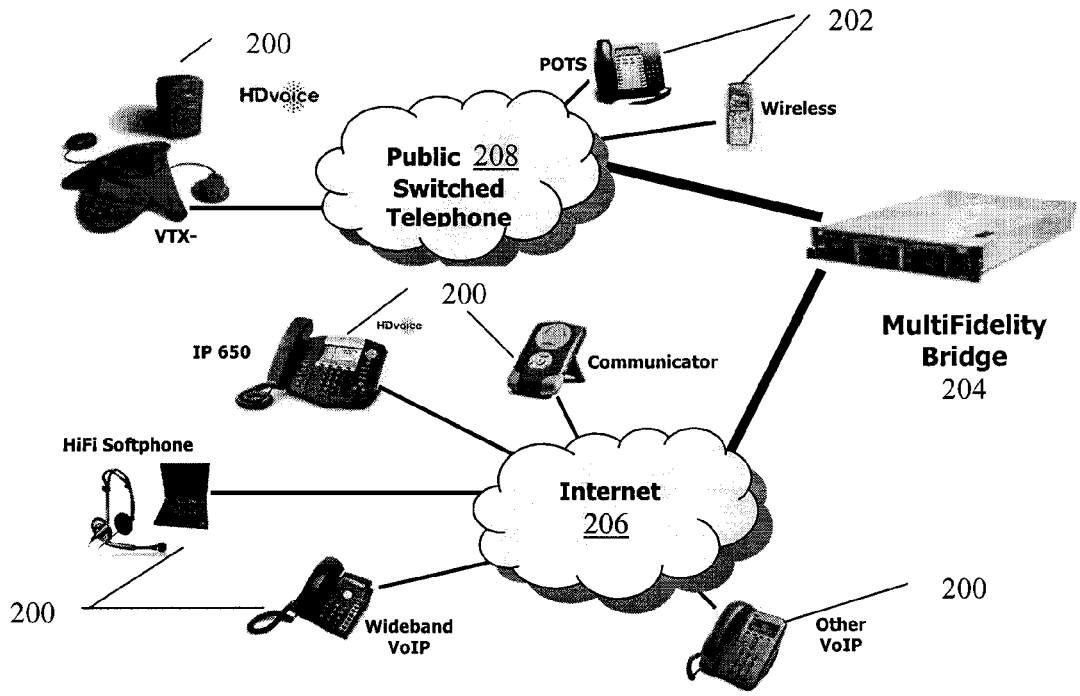
FIG. 2 is an exemplary overview illustration of a system according to an embodiment of the present invention.

As shown in FIG. 2, wideband endpoint devices 200 as well as narrow-band endpoint devices 202 interface with a multi-fidelity conferencing bridge 204 via wideband capable networks 206 and narrowband networks 208. The multi-fidelity conference bridge 204, according to the present invention, allows wideband endpoint devices 200 to operate at the higher response frequencies (and thus, higher fidelity) concurrently with narrow-band endpoint devices 202 (at a lower fidelity) while participating in the same conference. As shown in FIG. 2, endpoint devices are in numerous form and versions, including wired and wireless as well as Internet-based devices such as a "softphone" and/or Internet messaging clients such as computers configured to use VoIP via tools like GoogleTalk™ and Skype™.

Figure 3:
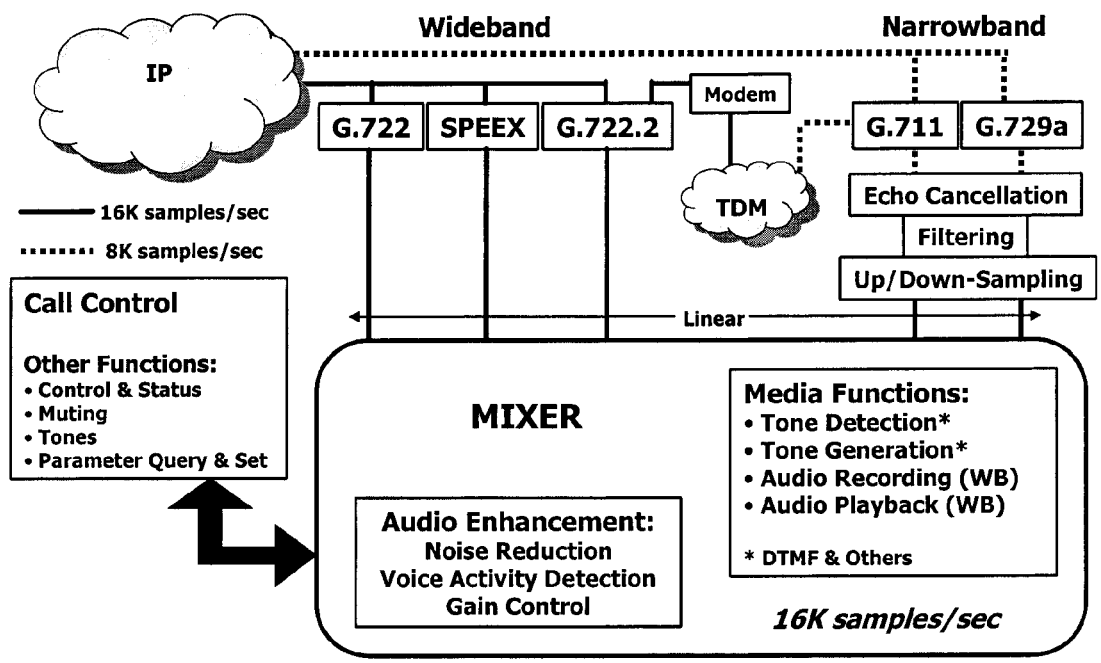
FIG. 3 is an exemplary diagram showing major functional blocks and interconnections according to an embodiment of the system.

FIG. 3 is an exemplary diagram showing major functional blocks and interconnections according to an embodiment of the system. In FIG. 3, conference participants can connect to the conferencing bridge system via, for example, an Internet Protocol (IP) network (such as the public Internet), and via wired or mobile telephones using a Time-Division Multiplexed (TDM) network, such as the Public Switched Telephone Network (PSTN). Connections to the conferencing bridge can be made using traditional narrowband signals. On the PSTN, narrowband signals are generally encoded using the ITU G.711 specification, as known to those of ordinary skill in the art and fully incorporated herein by reference, in either an "a-law" or "mu-law" variant. Narrowband signals over the Internet use a variety of codecs, including G.711 and also G.729a, also fully incorporated herein by reference. Other narrowband codecs can also be readily supported.

Wideband connections use different codecs. The ITU specifies several variants under the G.722 heading, including G.722, G.722.1, and G722.2, each specification is fully incorporated herein by reference. SPEEX is a family of codecs including several that are wideband-capable, known to those of ordinary skill in the art, and fully incorporated herein by reference. Other wideband codecs can be readily supported in accordance with embodiments of the present invention. The system converts between whatever coding scheme is used over the network, and a linear representation of the audio which is processed locally. This conversion is a function of the codec algorithm and is defined in the respective codec specification. The linear representation is readily manipulated with like signals to perform mixing, noise removal, speech detection, echo removal, gain control, and similar functions using well-known methods known to those of ordinary skill in the art. In FIG. 3, the diagram shows audio processing taking place at 16,000 samples per second. While this is the standard sample rate for several wideband codecs, it is to be recognized that other sample rates can also be used and are contemplated within the scope of this invention. Narrow-band codecs typically operate at 8,000 samples per second, so those signals can be adapted through an up-sampling and down-sampling process, as known to one of ordinary skill in the art. Other narrow-band sampling rates are also contemplated within the scope of this invention. Filtering can also be used to avoid introduction of noise, and echo cancellation can be applied to block the conference signal from being returned as an echo from a participant's station.

In FIG. 3, the participants are shown funneled into a wideband bridge. However, an alternate approach which delivers substantially the same functionality as the embodiment shown in FIG. 3 is also possible, as shown in FIG. 4.

Figure 4:
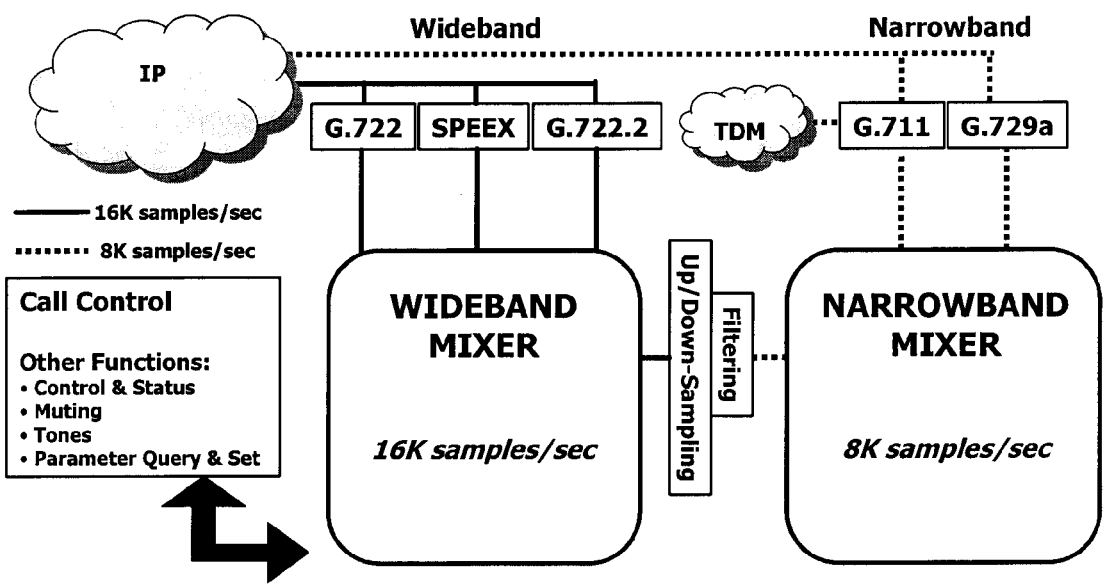
FIG. 4 is an exemplary diagram showing major functional blocks and interconnections according to an alternative embodiment of the system.

The embodiment shown in FIG. 4 is comprised of two bridges, one for the narrowband participants, and the other for the wideband participants, with a connection ("link") between the two bridges. The link can perform the functions of filtering and up/down frequency sampling (frequency conversion between the wideband mixer and the narrowband mixer). It is to be appreciated that the "link" can take any of several forms. In one embodiment the link is a "logical" link such that two separate software functions executing (the wide- and narrow-band mixers) communicate with each other via the link, which that involves passing digital audio data through, for example, a buffer in memory. In another embodiment, the link can comprise a physical connection between the wideband mixer and the narrowband mixer. The physical connection can be comprised of cable, wire, optical, wireless or combinations thereof. The link involves the physical connection (for example, Ethernet) as well as controlling software on the two ends, which would include necessary protocols and other functionality as described herein. In yet another embodiment, the "link" comprises a path through one or more networks. For example, the wideband mixer and the narrowband mixer can be connected through the Internet with the Internet pathway acting as the link.

This alternative embodiment comprised of a narrowband bridge and a wideband bridge allows adaptation of an embodiment of the invention to an infrastructure already in place to support narrowband (only) conferencing. At present, there are far more narrowband endpoints than there are wideband endpoints, so most conferences will likely be narrowband only and can be handled by today's mixing systems. As soon as a wideband endpoint attempts to join such a conference, a modified conferencing system can add a single additional leg to the narrowband conference, connecting it to a wideband mixer. Any additional wideband participants can be accommodated in the wideband mixer. An appropriately-configured system can automatically detect wideband participants and perform all the necessary connections transparently to the users. With the alternative embodiment approach as shown in FIG. 4, a narrowband-only infrastructure can be made "wideband capable" with a minimum of additional facilities.

Other functions traditionally used in narrow-band conference bridges are readily adapted to the wideband application. For instance, echo cancellation detects the voice(s) of the participant(s) being routed out the speaker and back through the microphone of a given endpoint; this situation (or others resulting in reflected energy) is detected and the echo is removed. Noise reduction algorithms recognize speech and when audio energy associated with a given participant that is not speech is detected it is blocked. In a more sophisticated implementation, noise in the presence of speech can be selectively eliminated. Gain control algorithms adapt incoming signals of varying levels such that all participants, when speaking, are equally audible. Voice activity detection determines which participants are speaking and propagates only the strongest of N signals, where N can be set by the system implementer or a user or administrator. The mixing function itself involves the summing of the signals, after they have been converted from their individual coding systems into a common, compatible (typically linear) representation.

In one embodiment, the wideband, mixed-mode conferencing system according to the present invention includes a call controller that accommodates participants via both the PSTN and the Internet. As with conventional conferencing systems, calls from PSTN participants can be handled using signaling from the telephone network and/or additional information received explicitly from the caller. These data items can include, for example, the number dialed, calling number, a conference identification code, and a password. Caller-provided data can be input via DTMF or via voice through voice-recognition software or an operator. Analogous information is available for callers connecting via the Internet, using any of a variety of established and emerging protocols such as the Session Initiation Protocol.

The call control function determines in which conference a caller is to participate, and connects the caller's audio stream to the appropriate mixer, regardless of whether the caller connects with the conferencing bridge in wideband mode or narrowband mode. A properly equipped and configured system can support a very large number of separate conferences and simultaneous participants. The call control function can, if desired, also add participants to the conference by calling them, based on input from an administrator or other participant. The flow diagram below shown in FIGS. 5A and 5B is an example of a call control function which handles calls from packet and public-switched telephone networks, attempts to connect narrowband calls using wideband-codec-over-modem technology (as previously described herein), and manages separate wide- and narrow-band bridges for the same conference.

Figure 5A:
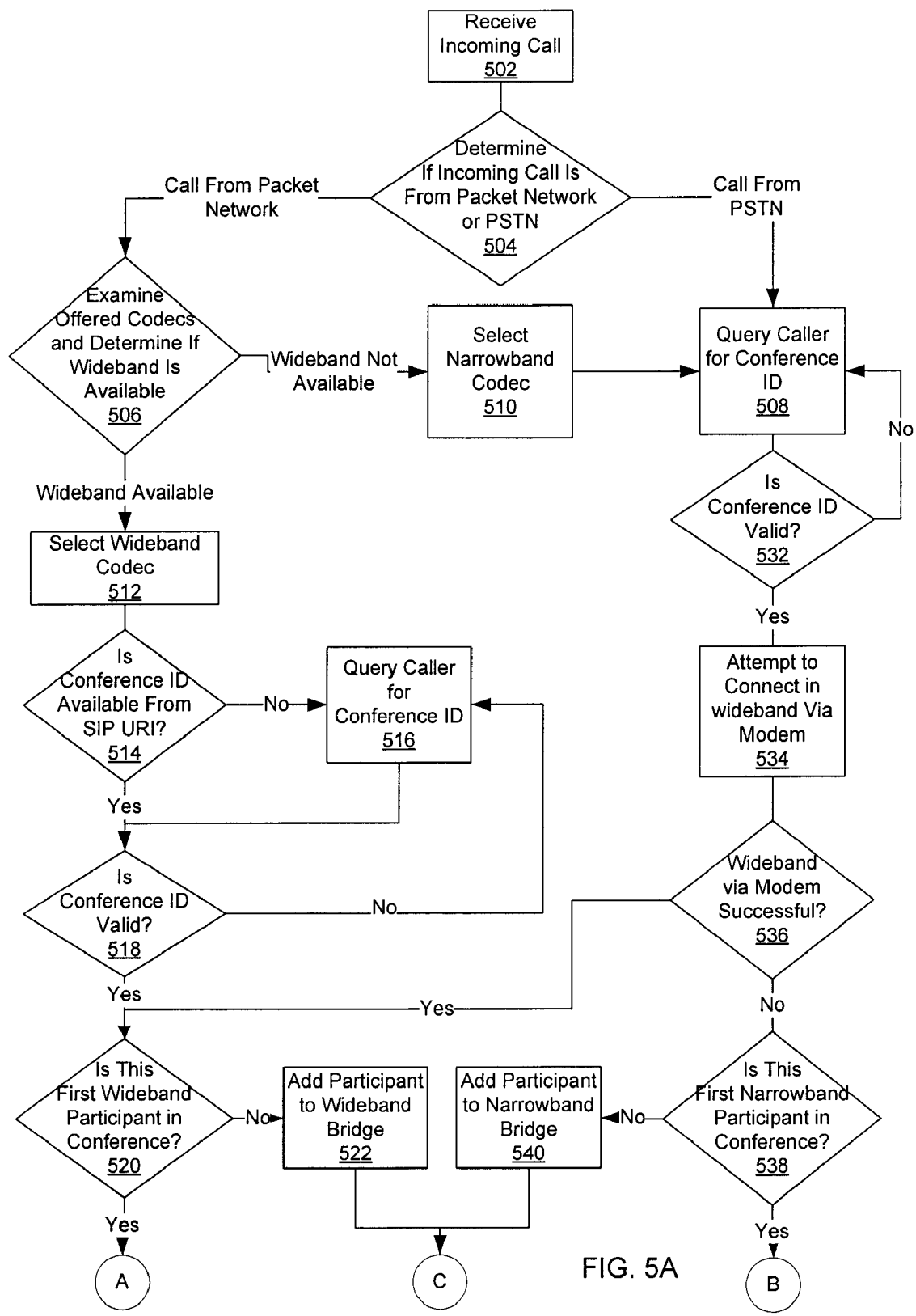
FIGS. 5A and 5B are an exemplary flow chart for a process of a call control function which handles calls from packet and public-switched telephone networks, attempts to connect narrow-band calls using wideband-codec-over-modem technology (as previously described herein), and manages separate wide- and narrow-band bridges for the same conference.
Figure 5B:
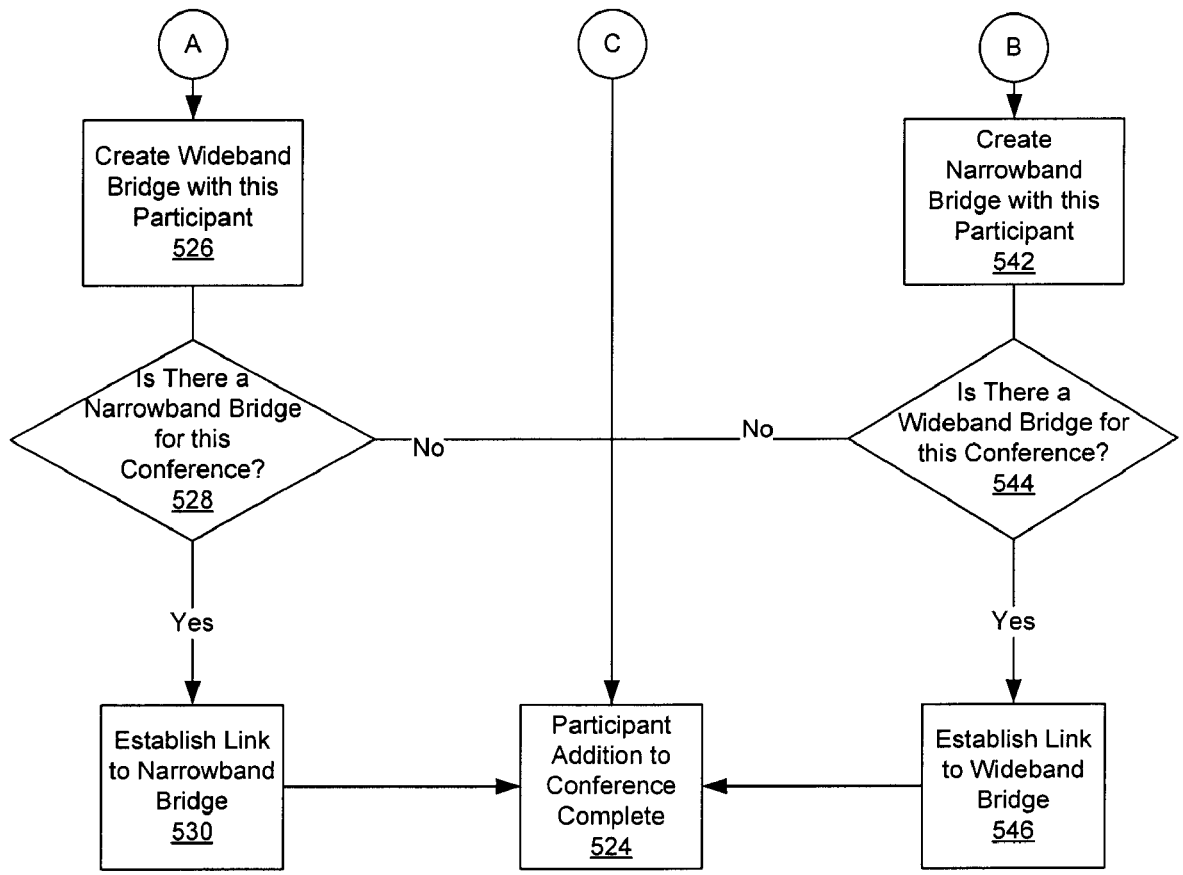

The exemplary process of FIGS. 5A and 5B begins at step 502, where an incoming call from an endpoint device is received by a conference bridge. At step 504, it is determined whether the received incoming call is from a packet network (e.g., Internet), or from the PSTN. The conference bridge can interface with and receive calls from the PSTN via several methods. For instance, a specific electronics card can be provided in the conferencing system and a connection for this purpose (typically a channelized T-1 or an ISDN Primary Rate Interface that ties into equipment at a telephone network service provider such as, for example, AT&T or Verizon). Another method is to subscribe to a "VoIP gateway" service that delivers PSTN calls via the Internet. (Similarly, a "VoIP gateway" device can be utilized, which has channelized T-1 or ISDN-PRI connections to the PSTN on one side, and a LAN connection on the other side which in turn goes to a server associated with the conferencing system.

If the incoming call is from a packet network, then the process goes to step 506. If the call is from the PSTN, then the process goes to step 508. At step 506, the codec(s) available for the received call is examined in order to determine whether one of them is a supported wideband codec and thus the received call can be processed in wideband mode. If, at step 506, it is determined that wideband is not available, then the process goes to step 510, where a narrowband codec is selected, and then on to step 508 (discussed in greater detail herein). Returning to step 506, if a wideband codec is available, the process continues on to step 512, where a wideband codec is selected and the conference bridge interacts with the endpoint device using the selected wideband codec. At step 514, it is determined whether a conference identifier is available from the SIP (session initiation protocol) URI (uniform resource identifier). If the conference ID is not available from SIP URI information, then the process goes to step 516, where the caller is queried to enter the conference ID. This may be accomplished by the caller entering the conference ID using the keypad of a calling device, speaking the conference ID, or by other means known in the art. If, at step 514, the conference ID is available from the SIP URI information, then at step 518 it is determined whether the conference ID is valid. If the conference ID is not valid, then the process returns to step 516. If the conference ID is valid, then the process continues to step 520. At step 520 it is determined whether the caller is the first wideband participant in the conference. If not (i.e., if there are already other wideband participants connected to the conference), then the process goes to step 522, where the participant is added to the wideband bridge and then on to step 524 where the new participant is announced to the conference. If, at step 520, it is determined that the participant is the first wideband participant to the conference, then the process goes to step 526, where a wideband bridge is created with this participant as the first enrollee. At step 528 it is determined whether there is a narrowband bridge for the conference in which the participant is enrolled. If not, then the participant is announced to the conference at step 524. If, at step 528, there is a narrowband bridge for the conference, then at step 530 a link is established to the narrowband bridge and at step 524 the participant is announced to the conference.

Returning to step 504, if it is determined that the incoming call originated from the PSTN (or other narrowband network), then at step 508 the caller is queried for a conference ID. At step 532 a check is performed to determine whether the conference ID received from the caller is valid. If not valid, then the process returns to step 508. If, at step 532, the conference ID is valid, then at step 534 the conference system tries to connect in wideband mode via a modem. This process is carried out according to the specifics of the calling device. For example, in the case of the Polycom™ device mentioned earlier, the process starts with a tone exchange. The conference system sends a signal consisting of three specific simultaneous tones; if it gets a specific corresponding response, it knows that the calling device is capable of the wideband-over-narrowband-modem transmission scheme and proceeds to establish the modem connection. Lack of the specific tone response indicates that the device is not capable of this protocol. Thus, at step 536 it has been determined if the attempt to connect in wideband mode via the modem was successful. If so, then the process goes to step 520 and goes through the process as previously described. If the attempt to connect in wideband mode via the modem at step 536 is not successful, then the process goes to step 538, where it is determined whether the caller is the first narrowband participant in the conference. If the caller is not the first narrowband participant, then the process goes to step 540, where the participant is added to the narrowband bridge, and then on to step 524, where the participant is announced to the conference. If, at step 538, the caller is the first narrowband participant for the conference, then the process goes to step 542, where a narrowband bridge is created for the participant. The process goes to step 544, where it is determined whether there is a wideband bridge for the conference. If not, then the process goes to step 524, where the participant is announced to the conference. If, at step 544, there is a wideband bridge for the (same) conference, then at step 546 a link is established to the wideband bridge, and at step 524 the participant is announced to the conference.

Other conference functions found in traditional narrowband conference systems can also be supported in the wideband-capable system. These functions include, but are not limited to, muting, voting, polling, question-and-answer, and recording. An administrative interface can provide a graphical display of conference functions and controls. An accounting system can record information on each participant and each conference and can be used in an associated billing system.

Another feature called "quick add" allows a participant to use a DTMF code to temporarily exit an active conference, place a call to a new party, and once reaching and conferring with that party, to direct the system to add that party to the conference and to also return the original participant to the conference.

Another feature called "bandwidth announce" informs participants of the wideband conferencing capability, based on each participant's mode of connection. For example, callers connecting via a wideband codec might hear, "You are connected in wideband," prior to joining the conference, while those using narrowband (conventional) connections might hear, for example, "This conference is available in wideband." This feature is intended to raise awareness of the wideband capability and promote use of the service.

An increasing number of business telephone systems (called Private Branch Exchanges, or PBXs) are wideband capable but typically only make wideband connections among endpoint devices directly connected to the PBX or among specially-connected PBX's. Calls to PSTN or "off-net" endpoints are generally converted to narrowband. To facilitate the use of wideband conferencing capability, a feature can be added to these PBXs to allow wideband connections to be made to the conferencing system by identifying the call as a wideband conference call and negotiating the connection via the Internet (or similar network) as such. This identification can be implemented by providing a special number or "feature code" that the participant dials to connect to the conference system, which the PBX interprets and acts on to make the appropriate wideband connection. Alternatively, the PBX can recognize the "standard" telephone number(s) used by wideband conferencing system(s) and automatically attempt a wideband connection. For example, if the published number of a wideband conference system is 800-432-HIFI, the PBX can, when detecting that this number has been dialed by a wideband-capable station, connect to the conferencing system via an Internet-based wideband connection, rather than routing the call through the (narrowband) PSTN.

The wideband capable conferencing system can also work in conjunction with other applications, just as narrowband-only systems do. For example, "web conferences" that allow participants to share their personal computer screens often include an audio conferencing component. Embodiments according to the present invention can provide wideband audio conferencing in conjunction with such a web-based system.

CONCLUSION

The above examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention Throughout this application, various publications and/or standards may be referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A multi-fidelity conferencing system comprising:
a wideband mixer configured to operate at a first sampling frequency, wherein the wideband mixer provides to at least one wideband device of a plurality of wideband devices a first fidelity audio conferencing signal sampled at a first sampling frequency, and wherein the at least one wideband device is coupled to the wideband mixer through at least one first network;
a narrowband mixer configured to operate at a second sampling frequency, wherein the narrowband mixer provides to at least one narrowband device of a plurality of narrowband devices a second fidelity audio conferencing signal sampled at the second sampling frequency, and wherein the at least one narrowband device is coupled to the narrowband mixer through at least one second network;
wherein the at least one wideband device is operatively coupled to the wideband mixer and the at least one narrowband device is operatively coupled to the narrowband mixer; and a single link that operatively couples the wideband mixer to the narrowband mixer and converts (i) a single audio signal originated through mixing of a plurality of audio signals sampled at the first sampling frequency into an audio signal sampled at the second sampling frequency and (ii) a single audio signal originated through mixing of a plurality of audio signals sampled at the second sampling frequency into an audio signal sampled at the first sampling frequency.

2. The multi-fidelity conferencing system of claim 1, wherein said one or more networks comprises an internet protocol (IP) network.

3. The multi-fidelity conferencing system of claim 2, wherein the IP network is the Internet.

4. The multi-fidelity conferencing system of claim 1, wherein said one or more networks comprises PSTN.

5. The multi-fidelity conferencing system of claim 1, wherein said one or more networks comprises an IP network and PSTN.

6. The multi-fidelity conferencing system of claim 1, wherein said first sampling frequency is 16,000 samples per second.

7. The multi-fidelity conferencing system of claim 1, wherein said second sampling frequency is 8,000 samples per second.

8. The multi-fidelity conferencing system of claim 1, wherein the at least one wideband device of the plurality of wideband devices is configured to connect to the multi-fidelity conferencing system using a narrowband modem and a wideband codec.

9. The multi-fidelity conferencing system of claim 1, wherein the at least one wideband device of the plurality of wideband devices is a softphone or an Internet messaging device.

10. The multi-fidelity conferencing system of claim 1, wherein the narrowband mixer comprises a conventional teleconferencing bridge device.

11. The multi-fidelity conferencing system of claim 1 further comprising a call controller, wherein said call controller receives data from a conference participant accessing the multi-fidelity conference system via one of the plurality of devices, determines a conference in which the conference participant is to participate, enrolls the conference participant in the conference, and connects the conference participant's endpoint device to the appropriate wideband mixer or narrowband mixer.

12. The multi-fidelity conferencing system of claim 11, wherein said call controller further comprises a quick add feature that is configured to enable a conference participant to temporarily exit a conference in order to dial out to a new party with an invitation to join the conference and then to rejoin the conference.

13. The multi-fidelity conferencing system of claim 12, wherein said conference participant rejoins the conference while connected with the new party.

14. The multi-fidelity conferencing system of claim 11, wherein said call controller further comprises a bandwidth announce feature such that announcements are made to the conference participant based on whether the conference participant's endpoint device is a wideband device or a narrowband device.

15. The multi-fidelity conferencing system of claim 1, wherein each said wideband device utilizes one of a G.722, SPEEX or G.722.2 codec when accessing the multi-fidelity conferencing system.

16. The multi-fidelity conferencing system of claim 1, wherein each said narrowband device utilizes one of a G.711 or G.729a codec when accessing the multi-fidelity conferencing system.

17. The multi-fidelity conferencing system of claim 1 further comprising at least one private branch exchange (PBX) system having one or more endpoint devices comprised of PBX stations that are wideband-capable, wherein said PBX determines whether a call placed from said PBX stations is a request for conferencing services or a normal telephonic call, and if said call is a request for conferencing services from said wideband-capable PBX station said request is routed by said PBX to said multi-fidelity conferencing system through a wideband-capable connection and if said call is a normal telephonic call it is routed by said PBX to a PSTN.

18. The multi-fidelity conferencing system of claim 17, wherein said wideband-capable connection is an IP network.

19. The multi-fidelity conferencing system of claim 18, wherein said IP network is Internet.

20. The multi-fidelity conferencing system of claim 1, wherein said multi-fidelity conferencing system is used in cooperation with a web-based conferencing system.

21. The multi-fidelity conferencing system of claim 1, wherein said multi-fidelity conferencing system is used in cooperation with a video conferencing system.

22. A method of multi-fidelity conferencing comprising:
receiving at an audio conferencing bridge at least two requests from a plurality of conference participants via two or more endpoint devices over one or more networks for conferencing services;
determining whether each said endpoint device is a wideband endpoint device or a narrowband input device and operatively connecting each wideband endpoint device to a wideband mixer of said audio conferencing bridge if said endpoint device is a wideband endpoint device and operatively connecting each narrowband endpoint device to a narrowband mixer of said audio conferencing bridge if said endpoint device is a narrowband input device, wherein the wideband mixer is operatively coupled to the narrowband mixer via a single link for that purpose;
providing conferencing services among said plurality of conference participants via said audio conferencing bridge, wherein conference participants employing wideband endpoint devices to access said audio conferencing bridge are provided a first fidelity audio conferencing signal sampled at said first sampling frequency and conference participants employing narrowband endpoint devices to access said audio conferencing bridge are provided a second fidelity audio conferencing signal sampled at said second sampling frequency; and
wherein the single link converts (i) a single audio signal originated through mixing of a plurality of audio signals sampled at the first sampling frequency into an audio signal sampled at the second sampling frequency and (ii) a single audio signal originated through mixing of a plurality of audio signals sampled at the second sampling frequency into an audio signal sampled at the first sampling frequency.

23. The method of claim 22, wherein receiving at an audio conferencing bridge at least two requests from the plurality of conference participants via two or more endpoint devices over one or more networks for conferencing services comprises receiving said requests over an IP network.

24. The method of claim 23, wherein the IP network is Internet.

25. The method of claim 22, wherein receiving at an audio conferencing bridge the at least two requests from a plurality of conference participants via two or more endpoint devices over one or more networks for conferencing services comprises receiving said requests over PSTN.

26. The method of claim 22, wherein receiving at an audio conferencing bridge the at least two requests from a plurality of conference participants via two or more endpoint devices over one or more networks for conferencing services comprises receiving said requests over an IP network and PSTN.

27. The method of claim 22, wherein said first sampling frequency is 16,000 samples per second.

28. The method of claim 22, wherein said second sampling frequency is 8,000 samples per second.

29. The method of claim 22, wherein said first sampling frequency is 16,000 samples per second and said second sampling frequency is 8,000 samples per second.

30. The method of claim 22, wherein receiving at an audio conferencing bridge the at least two requests from a plurality of conference participants via two or more endpoint devices over one or more networks for conferencing services comprises at least one of the wideband endpoint devices operatively connecting to the audio conferencing device using a narrowband modem and a wideband codec.

31. The method of claim 22, wherein said narrowband mixer comprises a conventional teleconferencing bridge device.

32. The method of claim 22 further comprising:
receiving by a call controller data from at least one of said plurality of conference participants accessing the multi-fidelity conference system via one of the two or more endpoint devices;
determining by said call controller of a conference in which the conference participant is to participate;
enrolling by said call controller the conference participant in the conference; and
operatively connecting by said call controller the conference participant's endpoint device to the appropriate wideband components or narrowband components of the audio conferencing bridge.

33. The method of claim 32 further comprising:
enabling by said call controller of a conference participant to temporarily exit a conference in order to dial out to a new party with an invitation to join the conference and then to rejoin the conference.

34. The method of claim 33, wherein said conference participant rejoins the conference while connected with the new party.

35. The method of claim 32 further comprising:
providing by said call controller a bandwidth announcement, wherein such announcements are made to the conference participant based on whether the conference participant's endpoint device is a wideband endpoint device or a narrowband endpoint device.

36. The method of claim 22, wherein each said wideband device utilizes one of a G.722, SPEEX or G.722.2 codec when accessing the audio conferencing bridge.

37. The method of claim 22, wherein each said narrowband device utilizes one of a G.711 or G.729a codec when accessing the audio conferencing bridge.

38. The method of claim 22, wherein receiving at the audio conferencing bridge at least two requests from a plurality of conference participants via two or more endpoint devices over one or more networks for conferencing services further comprises determining by a private branch exchange (PBX) whether a call placed from a wideband-capable PBX station associated with said PBX is a request for conferencing services or a normal telephonic call, and if said call is a request for conferencing services from said wideband-capable PBX station said request is routed by said PBX to said audio conferencing bridge through a wideband-capable connection and if said call is a normal telephonic call it is routed by said PBX to a PSTN.

39. The method of claim 38, wherein said wideband-capable connection is an IP network.

40. The method of claim 39, wherein said IP network is Internet.

41. The method of claim 22, wherein providing conferencing services among said plurality of conference participants via said audio conferencing bridge comprises providing said conferencing services in cooperation with a video conferencing system.

42. The method of claim 22, wherein providing conferencing services among said plurality of conference participants via said audio conferencing bridge comprises providing said conferencing services in cooperation with a web-based conferencing system.

43. The method of claim 22, wherein receiving at an audio conferencing bridge at least two requests from a plurality of conference participants via two or more endpoint devices over one or more networks for conferencing services comprises receiving said requests via at least one endpoint device comprised of a softphone or an Internet messaging device.

* * * * *